Feb. 8, 1927.
J. H. DERBY
1,616,742
VALVE
Filed Aug. 14, 1924
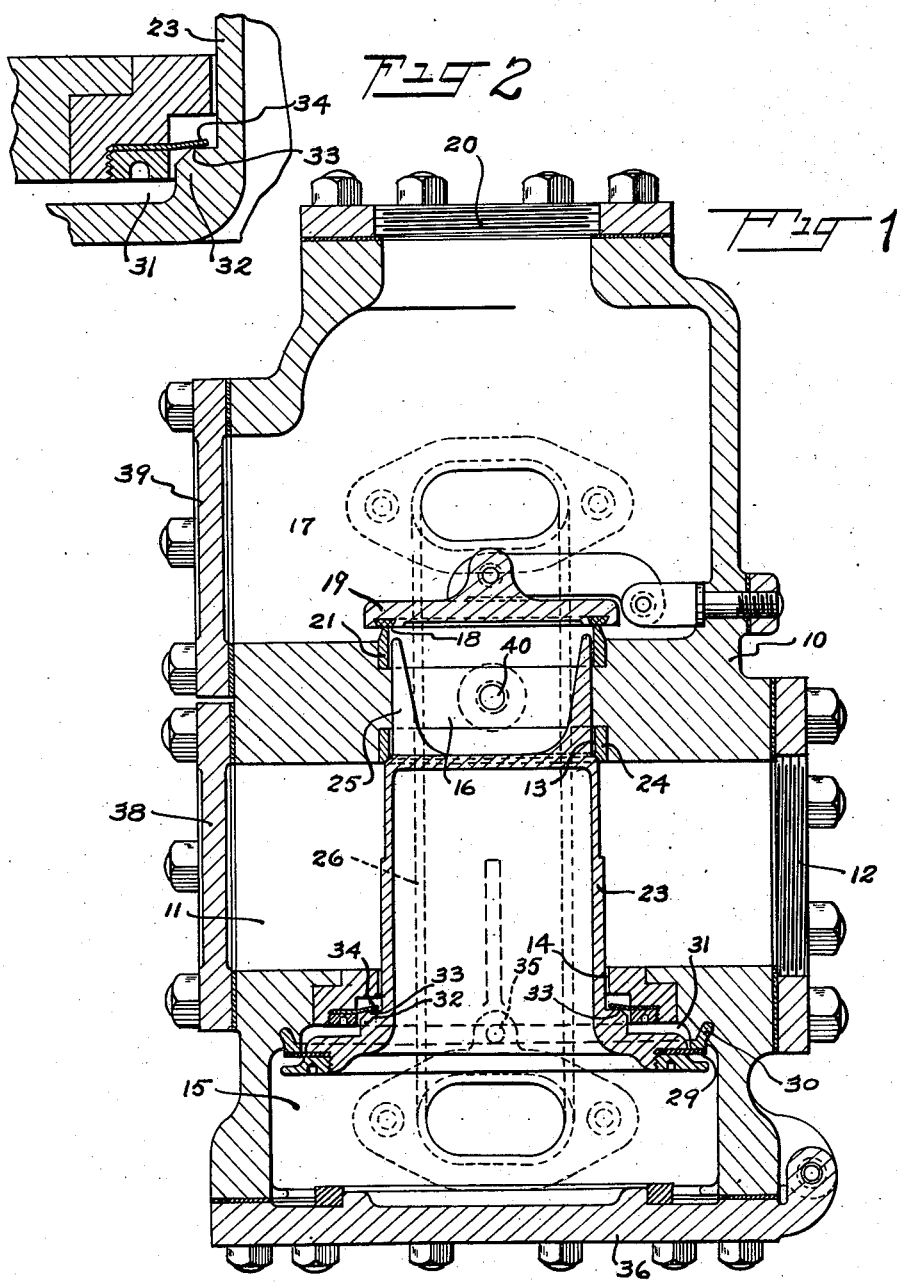
INVENTOR
John H. Derby
BY
ATTORNEYS Patented Feb. 8, 1927.

1,616,742

UNITED STATES PATENT OFFICE.

JOHN H. DERBY, OF NEW YORK, N. Y., ASSIGNOR OF ONE-HALF TO H. DORSEY SPENCER, OF WHITE PLAINS, NEW YORK.

VALVE.

Application filed August 14, 1924. Serial No. 731,982.

This invention relates to valves and particularly to valve seats.

An object of the invention is to provide a permanently tight and yet non-sticking valve seat. Another object of the invention is to provide a valve having a plurality of seats which may be closed tightly at all its seats at the same time.

An important feature of the invention is the provision of a flexible valve seat having a knife-edge contact which assures a tight closure and which will be self-cleaning and therefore will retain its original tightness in spite of any deposits which may be formed thereupon. Another feature is the employment, at one or more of the seats of a valve having a plurality of seats, of cooperating rigid and flexible seat members. Another feature consists in using the fluid pressure upon the flexible member of such a flexible valve seat to maintain a tight closure at the seat.

The accompanying drawings show the preferred form of my invention as embodied in the control valve of a dry-pipe automatic sprinkler system, which valve is of the general type shown and described in my prior Patent No. 756,835, of April 12, 1904.

In the drawings, Fig. 1 consists of a central vertical section of such a valve; and Fig. 2 is an enlarged showing of one of the seats thereof.

The valve illustrated comprises a casing 10 in which is formed a water supply chamber 11 with an inlet 12 and oppositely-disposed valve-controlled openings 13 and 14. Opening 14 connects with a counter-pressure chamber 15; while opening 13 forms an outlet into an air atmospheric chamber 16 having an opening 18 into a chamber 17 which communicates with the sprinkler system (not shown) through an opening 20. The opening 18 is normally closed by a check valve 19 which seats against a seat ring 21 in the wall of atmospheric chamber 16. Openings 13 and 14 are adapted to be closed by a thimble-shaped valve 23 which is adapted to seat rigidly against a seat ring 24 in the wall of the atmospheric chamber 16, and which has guide wings 25 thereon extending upwardly along this wall. Valve 23 is normally held in closed position against the seat ring 24 by the pressure against its inner surface of a fluid medium in chamber 15. In the particular embodiment of the invention shown, this fluid medium is the compressed air with which the pipes of a dry-pipe sprinkler system are filled. In order to allow this compressed air to reach the counter-pressure chamber 15, this chamber is connected to chamber 17 by means of a pipe 26.

A tight closure of opening 14 is secured by a pair of flexible valve seats, each of which is held tightly against a rigid seat by fluid pressure upon its flexible member. The side of opening 14 toward chamber 15 is normally closed by means of a ring 29 of flexible material, such as rubber, which is fastened on the base of valve 23 and extends outwardly therefrom so as to make contact, when the valve is in its closed position, with a seat ring 30 rigid with the casing 10 and is pressed thereagainst by the pressure medium in chamber 15. The side of opening 14 toward chamber 11 is tightly closed, as is particularly illustrated in Fig. 2, by means of a shoulder 32 formed on the valve 23 and having a sharp annular edge 33 which is adapted to be pressed against a flexible metallic ring 34 fastened to the casing and overlapping the shoulder 32. The provision of flexible members 29 and 34 insures a substantially tight closure of valve 23 against seat ring 24 whether or not the distance between the seat members on the valve exactly correspond to the distance between the seat members on the casing, and whether or not the expansion or contraction of the valve due to changing weather conditions exactly corresponds with the expansion or contraction of the casing. It also effectively prevents any substantial flow of fluid through opening 14 when the valve is closed, by utilizing the very pressures which would tend to cause such flow to maintain a tight closure of this opening. For example, the pressure of the fluid in the supply chamber 15 will tend to press the flexible ring 34 against the edge 33 of the shoulder 32, while the compressed air in chamber 15 will press flexible ring 29 against its seat ring 30. Seat members 33 and 34, moreover, form a self-cleaning seat, for each time the valve is opened and closed any sediment which has been deposited at the seat will be scraped off or shaken loose. Thus I provide a valve seat the tight closure of which is permanently assured.

An annular chamber 31, communicating with the outer air by means of a drain 35, may be provided between the seat members 29 and 33 so that any air which may be forced past the valve seat 29—30 and any water which may escape between the valve seat 32—34 may readily escape so as not to affect the balance of pressure by which the valve is maintained closed. There is also provided a drain 40 for chamber 16. Drains 35 and 40 are preferably provided with ball drips which are normally open; but which are closed under the effect of pressure, so as to prevent leakage of the supply fluid when the valve 23 is open. To drain 40 there may also be attached any of the standard alarm connections usually employed in automatic sprinkler systems.

In its preferred form the valve member is provided with a removable plate 36 which may be detached to secure access to the counter-pressure chamber 15, a removable plate 38 by the removal of which access may be had to chamber 11 to seat valve 23 or for any other purpose, and a removable plate 39 which may be detached to obtain access to chamber 17 for any purpose, as, for instance, to clean or to seat valve 19.

While the invention has been described as embodied in a valve of a particular type such as is adapted to close a supply chamber of a dry-pipe automatic sprinkler system, it will be understood that the invention is by no means limited to use in such a valve, but may be embodied in valves suited to numerous other uses and of various other types.

In the claims the expression "flexible ring" is used in the same sense in which it has been used in the specification, that is to say, to define a ring which is capable of yielding to movements of considerable magnitude. The expression does not include soft recessed packings or gaskets in rigid valves which are capable of only slight movement in a direction normal to their faces.

What is claimed is:

1. A valve member comprising in combination a valve casing, a valve, two valve seats, flexible rings bearing on said seats and being arranged to seat by pressure on the rings in opposite directions, said seats and flexible rings being so arranged as to divide the valve casing into three chambers, and means for normally maintaining a pressure in the chamber between the flexible rings not in excess of the pressure in either of the other two chambers.

2. A valve member comprising in combination a valve casing, a valve, a valve seat on said casing, a valve seat on said valve, a flexible ring attached to said casing and bearing on the seat on the valve, a flexible ring attached to the valve and bearing on the seat on the casing, said rings being seated by pressures in opposite directions, said seats and rings dividing the valve casing into three separate chambers, and means for maintaining the chamber between the flexible rings at a pressure normally not in excess of the pressure obtaining in either of the other two chambers.

3. A valve member comprising in combination a valve casing, a valve, a seat on said valve and a seat on said casing, a flexible metallic ring attached to the casing and bearing on the seat on the valve, a ring of soft flexible elastic material attached to the valve and bearing on the seat on the casing, the rings being seated by pressures in opposite directions and defining with the valve seats three separate chambers within the valve casing, and means for maintaining the pressure in the chamber defined between the rings at a pressure normally not in excess of that obtaining in either of the other two chambers.

4. In a valve of the character described, the combination with the casing providing a valve chamber and having an inlet and two opposed openings one of which forms an outlet, of a valve adapted to close said openings substantially simultaneously and to open away from said outlet and into an air-pressure chamber, the valve seat members being rigid at the outlet opening and comprising at the other opening a flexible ring carried by the valve casing and located in position to overlap the corresponding seat member on the valve between the latter member and the valve chamber, a supplementary flexible ring carrier by the valve within the air pressure chamber and adapted to seat against a supplementary seat member carried by the valve casing, and connections for supplying air under pressure to said pressure chamber.

5. In a valve member, a casing forming a liquid supply chamber and a counter-pressure chamber, a connecting opening between said chambers, an outlet opening in said liquid supply chamber, a valve to close both said openings substantially simultaneously, cooperating rigid seat members on said casing and on said valve at said outlet, a rigid seat member on said casing at the side of said connecting opening toward said liquid supply chamber, a flexible seat member carried by the said valve and so located as to be held against the last said seat member by fluid pressure in said counter pressure chamber, a shoulder about said valve at the side of said connecting opening toward said supply chamber, and a flexible metallic seat member carried by said casing and adapted to overlap said shoulder and to be held thereagainst by the liquid in said supply chamber when said valve is closed.

6. A valve member comprising in combination a supply chamber, a pair of oppositely disposed openings therein, a valve for closing said openings substantially simultaneously, a rigid seat at one of said openings, and means at the other of said openings for permanently assuring a tight closure of said valve, said means comprising a flexible metallic ring carried by the walls of said chamber, and a shoulder on said valve having a sharp annular edge adapted to bear against one of the surfaces of said ring, a valve seat on the casing of said chamber, and a ring of soft flexible elastic material carried by the valve and bearing on said seat, the soft flexible ring being closed by a pressure opposite to that which tends to force the metallic ring against its seat.

7. A valve member comprising a casing, a fluid supply chamber formed in said casing, an outlet for said chamber, a thimble-shaped valve for closing said outlet, a rigid seat for said valve at said outlet, a second chamber, an opening between said chambers adapted to be closed by said valve, a flexible metallic ring carried by the casing in said opening, a shoulder on the valve having a sharp annular edge adapted to bear against one of the surfaces of said metallic ring and so arranged that the ring is forced against the shoulder by the fluid pressure in the supply chamber, a valve seat in the casing at the mouth of the opening leading into the second chamber, and a ring of soft flexible elastic material carried by the valve and adapted to bear against the seat in the casing under the influence of fluid pressure in the second chamber.

8. A valve member comprising in combination a casing, a fluid supply chamber formed in said casing, an outlet for said chamber, a thimble-shaped valve for closing said outlet, a rigid seat for said valve at said outlet, a second chamber, an opening between said chambers adapted to be closed by said valve, a flexible metallic ring carried by the casing in said opening, a shoulder on said valve provided with a sharp annular edge adapted to bear against one of the surfaces of the ring, a second shoulder on said valve extending beyond the first shoulder and registering in a recess in the casing at the mouth of the opening into the second chamber, a valve seat surrounding the edge of said recess, a ring of soft flexible material carried by the second shoulder of the valve and bearing against the seat in the casing, said soft flexible ring being normally held against the seat by a fluid pressure in the second chamber, and means for draining the space between the second shoulder of the valve and the casing.

9. A fluid operated valve member comprising in combination a casing, a fluid supply chamber in said casing, an outlet from said chamber, a second chamber, an opening connecting the chambers, a valve provided with a rigid seat closing the outlet, and two seats and flexible rings closing the opening between the chambers, said rings being actuated by forces in opposite directions and being so arranged that the valve tends to open both the opening and the outlet on reduction of fluid pressure in the second chamber.

10. A valve member, according to claim 9, in which one of the flexible rings is of metal and the other of a soft flexible elastic material.

11. A fluid operated valve member comprising in combination a fluid supply chamber, an outlet chamber communicating therewith, a second chamber communicating with the fluid chamber through an opening, means for simultaneously establishing fluid pressure in the outlet and second chambers, a rigid valve seat on the outlet, a valve closing the outlet and the opening to the second chamber and having a face which bears on the rigid seat, a shoulder on the portion of the valve closing the opening, a flexible metallic ring attached to the casing of the supply chamber in opening and bearing on the shoulder on the valve, said metal ring being forced against the shoulder by fluid pressure in the supply chamber, a ring of soft flexible elastic material on the valve, and a seat on the casing in the mouth of the opening into the second chamber, the soft flexible ring being adapted to bear against the seat and tending to be forced against the seat by fluid pressure in the second chamber, whereby the valve is adapted to simultaneously open both the outlet and opening on reduction of pressure in the second chamber.

Signed at New York, New York, this 12th day of August, 1924.

JOHN H. DERBY.